United States Patent
Huh et al.

(10) Patent No.: US 7,561,892 B2
(45) Date of Patent: Jul. 14, 2009

(54) PT SERVICE SYSTEM AND METHOD

(75) Inventors: Kang-Suk Huh, Gyeonggi-Do (KR);
Kyung-Ae Yoon, Gyeonggi-Do (KR);
Young Hwan Park, Gyeonggi-Do (KR);
Jong Chul Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 11/187,947

(22) Filed: Jul. 25, 2005

(65) Prior Publication Data
US 2006/0019692 A1    Jan. 26, 2006

(30) Foreign Application Priority Data
Jul. 24, 2004  (KR) .................. 10-2004-0058080

(51) Int. Cl.
*H04B 7/00* (2006.01)
*H04Q 7/20* (2006.01)

(52) U.S. Cl. .................. 455/518; 455/519; 455/529; 455/416; 370/260

(58) Field of Classification Search .................. 455/512, 455/517–520, 458, 445, 416, 414.1, 463; 370/352, 354, 373, 377, 384, 385, 522, 524, 370/401, 341, 468, 335, 260, 329, 342; 379/229, 379/221.08, 221.09, 221.1, 221.12
See application file for complete search history.

(56) References Cited

U.S. PATENT DOCUMENTS

| | | | |
|---|---|---|---|
| 5,249,304 A * | 9/1993 | Mulford | 455/512 |
| 5,369,783 A * | 11/1994 | Childress et al. | 455/17 |
| 6,321,093 B1 * | 11/2001 | Dalal | 455/512 |
| 6,477,150 B1 | 11/2002 | Maggenti et al. | |
| 6,904,285 B2 * | 6/2005 | Drozt et al. | 455/450 |
| 7,170,863 B1 * | 1/2007 | Denman et al. | 370/260 |
| 7,283,489 B2 * | 10/2007 | Palaez et al. | 370/277 |
| 2002/0077136 A1 | 6/2002 | Maggenti et al. | |
| 2002/0173327 A1 * | 11/2002 | Rosen et al. | 455/518 |
| 2004/0151138 A1 * | 8/2004 | Paltemaa | 370/329 |
| 2004/0179689 A1 * | 9/2004 | Maggenti et al. | 380/270 |
| 2004/0190535 A1 * | 9/2004 | Albal et al. | 370/401 |
| 2006/0030347 A1 * | 2/2006 | Biswaas | 455/518 |
| 2006/0189337 A1 * | 8/2006 | Farrill et al. | 455/518 |

FOREIGN PATENT DOCUMENTS

| | | |
|---|---|---|
| GB | 2 290 196 A | 12/1995 |
| KR | 10-2004-0093530 A | 11/2004 |
| WO | WO-01/67674 A2 | 9/2001 |

* cited by examiner

*Primary Examiner*—Sujatha Sharma
(74) *Attorney, Agent, or Firm*—Birch, Stewart, Kolasch & Birch, LLP

(57) ABSTRACT

A PT service system and method are provided. According to an embodiment, there is provided a client device comprising a PT (push-to) client to transmit a talk burst request message for requesting a permission to send a talk burst. The talk burst request message includes a timestamp which includes time information associated with the transmission of the talk burst request message.

21 Claims, 5 Drawing Sheets

PT SERVICE SYSTEM AND METHOD

This application claims, under 35 USC § 119, the priority benefit of the Korean Patent Application No. 10-2004-0058080 filed in Republic of Korea on Jul. 24, 2004, which is hereby incorporated by reference.

BACKGROUND OF THE INVENTION

1. Field of the Invention

The present invention relates to a PT (push-to) service and, more particularly, to a PT service system and method capable of enhancing service quality by transmitting and processing a talk burst request message.

2. Description of the Related Art

A PT service, which is intended to provide rapid communications for service providers and consumers of mobile network, is a communication service in which one client transmits media data (talk burst) to one or more other clients with which a session has been established. A PT service can be a push to talk (PTT) service for transmission of voice (audio) data, a push to view (PTV) service for transmission of moving picture (video) data, or a push to data (PTD) service for transmission of data. The PT service allows communication with a single recipient (1-to-1) or between groups of recipients as in a group chat session (1-to-many), and uses a session initiation protocol (SIP) to establish a session.

In a PT service system, a PT client (e.g., a client supporting a PT service) that wishes to transmit media data must first have an authority/permission to transmit the media data. Thus, prior to the actual transmission of the media data (talk burst), the PT client that wishes to transmit the media data transmits a request for a talk burst (a talk burst request message) to an associated PT server. In response to the talk burst request message, the PT server may transmit a talk burst granted message to the PT client. Once the PT client receives the talk burst granted message indicating that the PT client currently has the talk burst, then the PT client may perform the talk burst by transmitting the media data. This process is illustrated in FIG. 1.

More specifically, FIG. 1 illustrates the construction of a PT service system according to a background art. As shown in FIG. 1, the PT service system includes PT clients 21, 22, 23 and 24 each included in a mobile terminal and calling (paging) a PT service, and a PT server 10 which controls various functions of the system.

In this example, the first to fourth clients 21-24 are participating in a conference. The first PT client 21 obtains a talk burst and the second to fourth clients 22-24 are listening to the first PT client 21.

While the first PT client 21 is performing the talk burst (e.g., transmission of voice, video, or data), the other PT clients 22-24 each can transmit a talk burst request message to the PT server 10 in order to obtain a next talk burst following the first PT client 21.

Upon receiving the talk burst request messages from the PT clients 22-24, the PT server 10 places the talk burst request messages in a queue in the order of the reception and authorizes the talk burst in the order of the queue placement. For instance, if the PT server 10 receives the talk burst request messages from the second, the third and the fourth PT clients 22-24 in that order, then the PT server 10 gives the talk burst in that same order, i.e., the second, the third and then the fourth PT client. No time information is included in the talk burst request message according to the background art.

The talk burst request messages are transmitted to the PT sever 10 through a user datagram protocol (UDP) based on a RTCP (real time transport control protocol) for real time processing.

Namely, in the case that the talk burst request message is transmitted by using an unreliable UDP or if handoff occurs according to the movement of the PT clients, the talk burst request messages transmitted by the PT clients can be lost. In this respect, the related art PT service system does not define a solution for this case where the talk burst request message(s) transmitted by the PT client(s) are lost. This is a problem because, if the talk burst request message is lost, reliability of the service to the client and user service quality are degraded.

In addition, if the talk burst request messages transmitted by the PT clients are delayed in transmission due to a network load, reliability of the PT service is also degraded.

SUMMARY OF THE INVENTION

Therefore, one object of the present invention is to provide a PT service system and method for definitely defining a process procedure of a PT client in preparation for a loss of a talk burst request message transmitted by the PT client.

Another object of the present invention is to provide a PT service system and method for defining a format of a talk burst request message transmitted by a PT client.

Another object of the present invention is to provide a mobile terminal having a PT client capable of generating and transmitting a talk burst request message including a timestamp.

Another object of the present invention is to provide a mobile terminal having a PT client capable of retransmitting a talk burst request message including a timestamp that indicates when the original talk burst request message was sent.

Another object of the present invention is to provide a PT server capable of placing talk burst requests in a talk burst request queue according to timestamp values of received talk burst request messages.

Another object of the present invention is to provide a mobile terminal, a PT server, a PT system, and a method for providing a PT service, which overcome the problems and limitations associated with the background/related art.

To achieve at least the above and other objects in whole or in parts, there is provided according to an aspect of the present invention a PT service system including: a PT client for transmitting a talk burst request message including a timestamp; and a PT server for determining a talk burst request queue position based on the timestamp and transmitting a response message with respect to the received talk burst request message to the corresponding PT client.

To achieve at least these advantages in whole or in parts, there is further provided according to another aspect of the present invention a PT service system having at least one or more terminal each having a PT client which transmits the talk burst request message including a timestamp and transmits a new talk burst request message including the timestamp of the original talk burst request message if a response message with respect to the talk burst request message is not received within a certain time.

To achieve at least these advantages in whole or in parts, there is further provided according to another aspect of the present invention a PT service method including: transmitting, by a PT client, a talk burst request message including a timestamp; receiving a response message with respect to the talk burst request message within a certain time; and retransmitting a new talk burst request message including the timestamp if a response message with respect to the talk burst request message is not received with a certain time.

To achieve at least these advantages in whole or in parts, there is further provided according to another aspect of the present invention a PT service method including: receiving, by a PT server, a talk burst request message from a PT client; determining a talk burst request queue position based on a value of a timestamp of the talk burst request message; and transmitting a response message with respect to the talk burst request message to the PT client.

To achieve at least these advantages in whole or in parts, there is further provided according to another aspect of the present invention a PT service method including: receiving a talk burst request message from one or more PT clients; placing, by a PT server which has received the talk burst request message, the corresponding talk burst request in a talk burst request queue according to a timestamp of the talk burst request message; and transmitting, by the PT server, a response message with respect to the talk burst request message.

To achieve at least these advantages in whole or in parts, there is further provided according to another aspect of the present invention a PT service method of a system in which a specific PT client obtains talk burst, including: transmitting, by a first PT client, a talk burst request message including a first timestamp, to a PT server; re-transmitting, by the first PT client, the talk burst request message including the first timestamp to the PT server if a response message with respect to the first transmitted talk burst request message is not received within a certain time; transmitting, by a second PT client, a talk burst request message including a second timestamp to the PT server; receiving, by the second PT client, a response message with respect to the talk burst request message; and receiving a response message, by the first PT client, a response message with respect to the re-transmitted talk burst request message.

Still, according to another aspect of the present invention, there is provided a client device comprising: a PT (push-to) client to transmit a talk burst request message for requesting a permission to send a talk burst, the talk burst request message including a timestamp which includes time information associated with a transmission of the talk burst request message.

According to another aspect of the present invention, there is provided a client device comprising: a PT (push-to) client to repeat a transmission of a talk burst request message for requesting a permission to send a talk burst, until the PT client receives a response message, wherein the repeated talk burst request message includes a timestamp value that indicates when the talk burst message was first transmitted.

According to another aspect of the present invention, there is provided a server system comprising: a PT (push-to) server to receive and process at least one talk burst request message each for requesting a permission to send a talk burst, wherein the at least one talk burst request message each includes a timestamp which includes time information associated with a transmission of the corresponding talk burst request message.

According to another aspect of the present invention, there is provided a method of providing a PT (push-to) service, the method comprising: transmitting, by a PT client, a talk burst request message for requesting a permission to send a talk burst, the talk burst request message including a timestamp which includes time information associated with a transmission of the talk burst request message.

According to another aspect of the present invention, there is provided a method of providing a PT (push-to) service, the method comprising: receiving, by a PT server, at least one talk burst request message each for requesting a permission to send a talk burst, wherein the at least one talk burst request message each includes a timestamp which includes time information associated with a transmission of the corresponding talk burst request message; and processing, by the PT server, the at least one talk burst request message.

According to another aspect of the present invention, there is provided a PT (push-to) service method of a system including a PT server and a plurality of PT clients, the method comprising: transmitting, by each of the PT clients, a talk burst request message including a timestamp; and determining, by the PT server, talk burst request queue positions of the PT clients at least based on the timestamps.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The PT service system and method in accordance with the preferred embodiments of the present invention will now be described with reference to the accompanying drawings.

According to an embodiment of the present invention, in preparation for a loss or delay of a talk burst request message once it is transmitted by a PT client of a PT service system, the PT client generates a talk burst request message based on an RTCP application packet including a timestamp, and a PT server places the talk burst request in a talk burst request queue based on the timestamp included in the talk burst request message. In this case, the timestamp includes time information identifying the time when the talk burst request message is sent by the PT client, e.g., when the user pushes a talk burst button on the user's terminal.

According to the embodiment of the present invention, if, for some reasons, the PT client does not receive a response message from the PT server with respect to the original talk burst request message within a certain time, the PT client repeats transmission of the talk burst request message until the PT client receives a response message from the PT server. The repeated talk burst request message includes the timestamp of the original talk burst request message, and thus indicates when the original talk burst request message was sent. When the PT server receives the repeated talk burst request message having the timestamp of the original talk burst request message, the PT server can place the talk burst request of the PT client in the talk burst request queue according to the timestamp value of the original talk burst request message. In this manner, the talk burst requests of the PT clients can be placed in the talk burst request queue according to the timestamp values provided in the talk burst request messages of the PT clients. A PT client at the head of the queue would currently have the permission to send the talk burst.

According to the embodiment of the present invention, if the value of the timestamp of the talk burst request message is significantly earlier than the current time at the PT server, the PT server may discard the talk burst request message. Namely, the PT server places the talk burst request message which arrives within a period until a talk burst is handed over from a current PT client to a next PT client in the queue, and discards any talk burst request message before the period.

Figure 1:
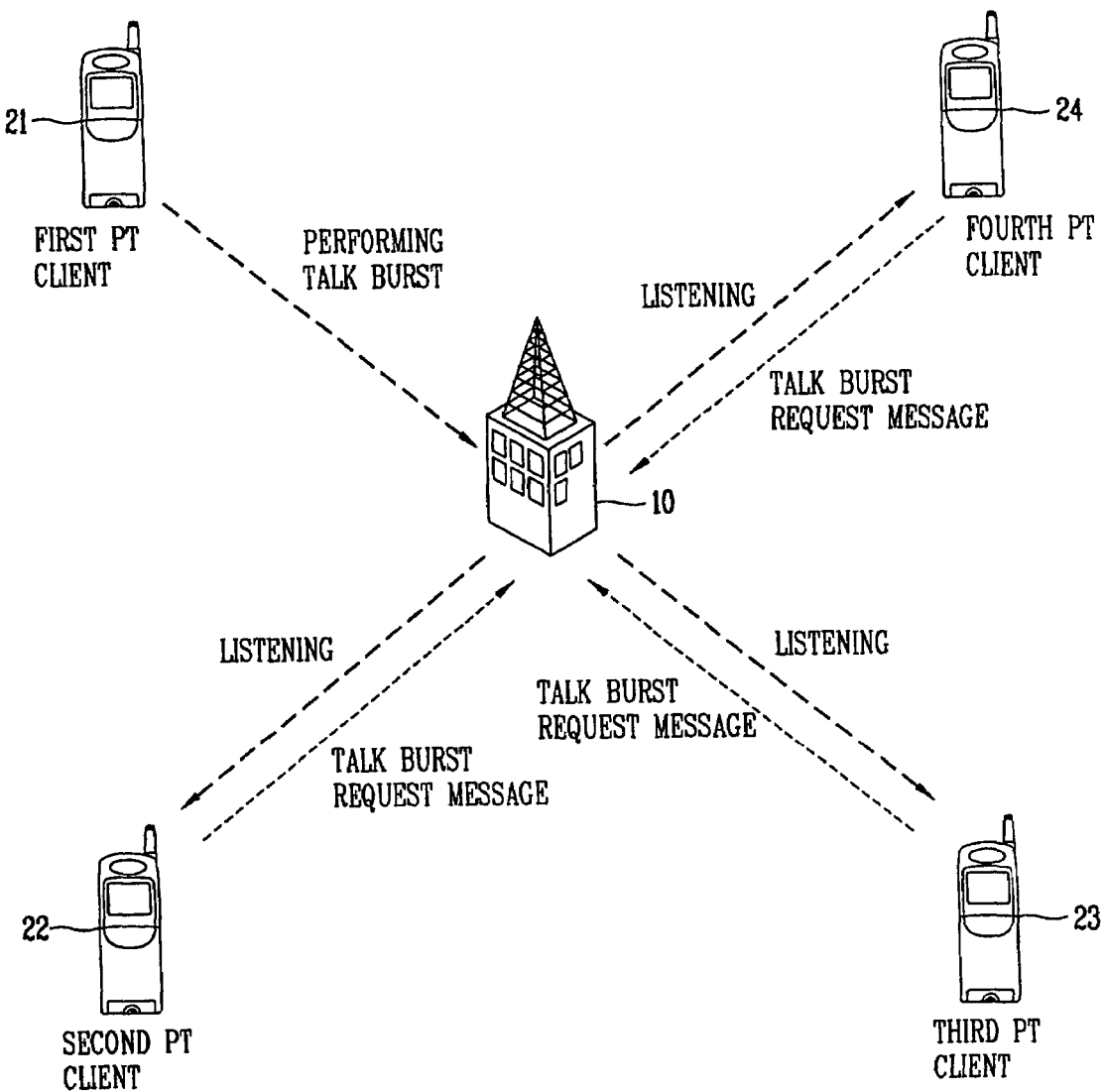
FIG. 1 illustrates the construction of a PT service system according to a background art.
Figure 2:
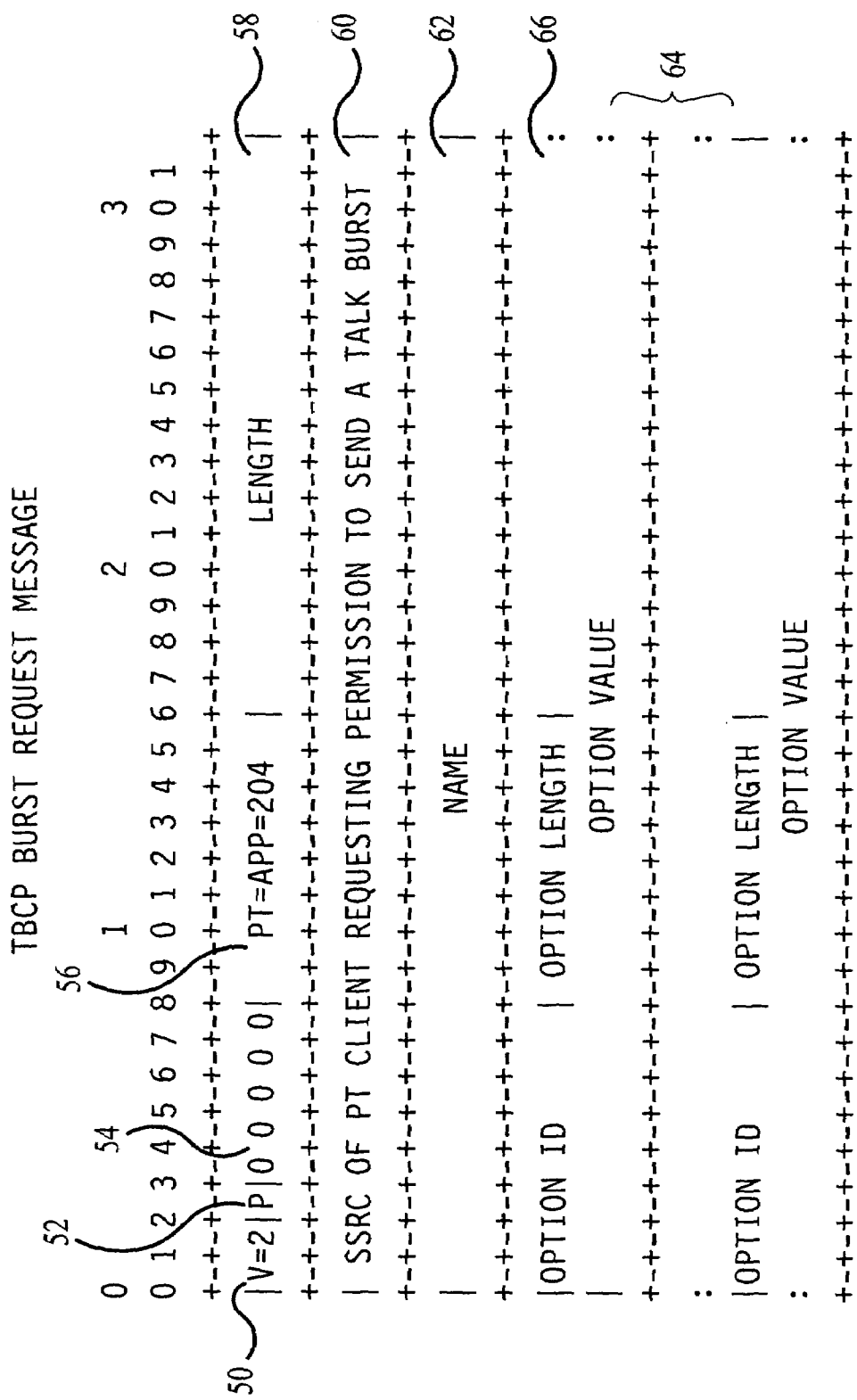
FIG. 2 illustrates a format of a talk burst request message in accordance with an embodiment of the present invention.

FIG. 2 illustrates a format of a modified RTCP application format in accordance with an embodiment of the present invention, namely a format of a talk burst control protocol (TBCP) message. The TBCP message is based on the RTCP application packet format and in this example, represents a TBCP talk burst request message according to the present invention.

As shown in FIG. 2, the RTCP application packet includes a field 50 for defining a version with 2 bits (e.g., V=2), a field 52 for defining whether a padding octet has been included or not (e.g., P indicates padding included), a packet type field 56 (e.g., PT=APP=204) for defining the RTCP application; a subtype field 54 for defining a detailed condition of the application; a length field 58 for defining a length of the RTCP application; an SSRC (Synchronization) field 60, an application name field 62 defined by ASCII, and one or more option fields 64. Each option field may have subfields as shown. The fields 50-62 are known in the art. According to an embodiment of the present invention, one option field 64 is designated as a timestamp field 66.

In order to define the RTCP application packet as a talk burst request message, the packet type field 56 has a value of '204' and the sub-type field 54 has a value of '00000' as shown. Namely, '204' in the packet type field 56 defines the TBCP message and '00000' in the sub-type field 54 indicates that the TBCP message is a talk burst request message.

The timestamp field 66 is a field for identifying a time point when the talk burst request message is transmitted to the PT server, e.g., when the user requests the talk burst. If the PT client repeatedly transmits the talk burst request message (e.g., because the PT client has not received a response to the previously transmitted talk burst request message from a PT server), the value of the timestamp of the repeatedly transmitted talk burst request message indicates a time point at which the first/original talk burst request message was transmitted by the PT client. In this case, the timestamp value in the timestamp field 66 can identify the user-requested time point of the talk burst request message in such a form as '13:30:22, Dec. 10, 2004' which identifies year, date, time, minute, and second, or can be expressed as binary values or bits. The present invention encompasses other forms of the timestamp.

Figure 3:
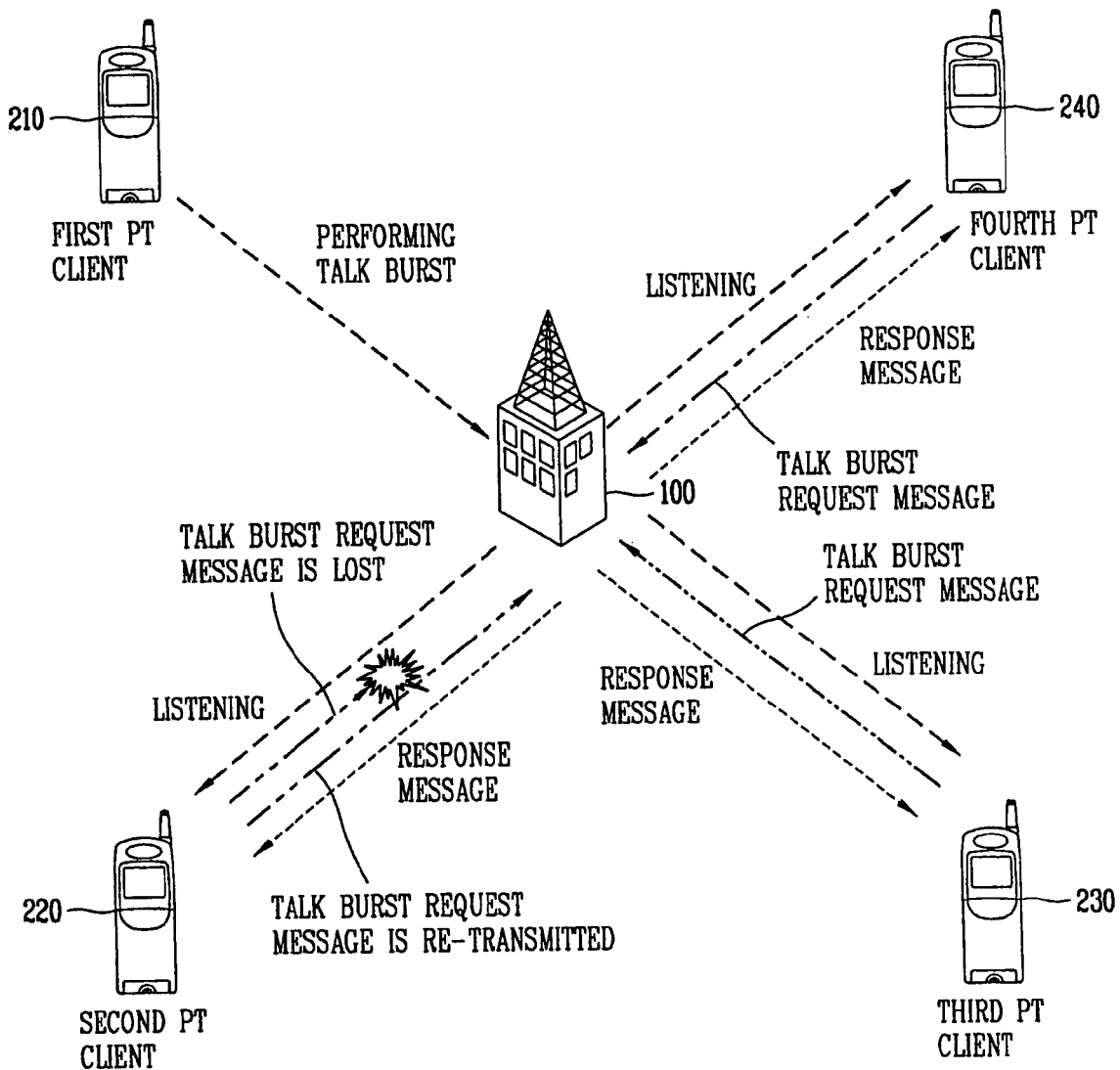
FIG. 3 illustrates the construction of a PT service system in accordance with an embodiment of the present invention.

FIG. 3 illustrates the construction of a PT service system in accordance with an embodiment of the present invention. As shown in FIG. 3, the PT service system includes PT clients 210-240 each installed in a mobile terminal and calling (paging, requesting) a PT service, and a PT server 100 controlling various PT functions. Each mobile terminal (e.g., a mobile phone, PDA, etc.) may include one or more clients providing different applications or functions. Each component of the PT service system is operatively coupled.

The mobile terminals supporting the PT service are configured to add the timestamp value in the talk burst request message, and then transmit it to the PT server 100. At this time, the generation of the timestamp value and the timestamp field (e.g., 66 in FIG. 2) can be managed by installing a timestamp management module in the mobile terminals or can be implemented by software. Herein, the timestamp in the timestamp field of the talk burst request message includes a time point at which the talk burst request message is transmitted (e.g., when the user requests the talk burst by pushing a button on the mobile terminal).

If the talk burst request message transmitted by the PT client 220 is lost or delayed and thus a response message from the PT server 100 is not received within a certain time duration, the PT client 220 re-transmits the talk burst request message. At this time, the value of the timestamp of the re-transmitted talk burst request message is the value of the timestamp of the original talk burst request message. That is, the value of the time stamp of the re-transmitted talk burst request message identifies the initial transmission time point included in the lost talk burst request message, and not a current time point at which the talk burst request message is re-transmitted. In the retransmission of the talk burst request message, a new talk burst request message may be generated which includes the time stamp of the original talk burst request message, or the original talk burst request message having the original timestamp may be transmitted again.

The PT server 100 transmits a response message with respect to the talk burst request message to the PT clients 220-240, and determines an allocation order of the next talk burst in the order of each transmission time included in the talk burst request message.

More specifically, when the PT server 100, which has allocated a talk burst to a specific PT client, receives a talk burst request message from another PT client, the PT server 100 determines a position of the received talk burst request message in the talk burst request queue by using a value of a timestamp in the received talk burst request message. Namely, a PT client having the earliest talk burst request time among PT clients that have transmitted talk burst request messages, can be placed at the head of the talk burst request queue according to the timestamps of the talk burst request messages, and the PT client at the head of the talk burst request queue currently has the permission to send the talk burst (media data).

According to an embodiment of the present invention, there may be a plurality of talk burst request queues each assigned with a certain preset priority level. The talk burst request timestamps may dictate the position of the talk burst request messages in the queue having the same preset priority level. That is, among the talk burst request messages having the same preset priority level, these requests may be allocated to different positions in a queue (assigned to that preset priority level) according to the talk burst request timestamps in the talk burst request messages.

According to an embodiment of the present invention, each PT client may transmit information indicating that its talk burst request message includes or will include a talk burst request timestamp. By examining this information, the PT server can process the talk burst request messages appropriately.

The operation of the PT service system according to an embodiment of the present invention will be described with reference to FIGS. 2 and 3 as follows.

In this example, the first to fourth clients 210-240 are participating in a conference, i.e., a session is established among these clients. It is assumed that the first PT client 210 is performing a talk burst (e.g., a user is speaking into his/her mobile terminal or is sending a video stream or data from his/her mobile terminal) and the second to fourth PT clients 220-240 are listening to the first PT client 240 (or receiving the transmitted information from the first PT client 210).

While the first PT client 210 is performing the talk burst, each of the other PT clients 220-240 transmits a talk burst request message to the PT server 100 in order to obtain a next talk burst after the first PT client 210. In this case, each talk burst request message includes a talk burst request timestamp. For instance, the talk burst request message can be in the form of the RTCP application packet shown in FIG. 2, and thus includes the timestamp field 66 containing the talk burst request timestamp.

A talk burst request message of the second PT client 220 includes a first timestamp, a talk burst request message of the third PT client 230 includes a second timestamp, and a talk burst request message of the fourth PT client 240 includes a third timestamp. The first to third timestamps include a transmission time of the talk burst request message transmitted by each PT client, and it is assumed for this example that the first to third timestamps have transmission time values from the earliest data/time to the latest data/time in sequence. That is, the first timestamp has an earlier transmission time value than that of the second timestamp, and the second timestamp has an earlier transmission time value than that of the third timestamp). In this case, the value of the transmission time can be expressed in such a form as '13:30:22, Dec. 10, 2004' or can be stored as binary values or bits.

When the PT server 100 receives the talk burst request messages from the third and fourth PT clients 230 and 240, it queues these requests in a talk burst request queue according to the talk burst request timestamp values in the received talk burst request messages, and transmits a response message with respect to the talk burst request messages to each of the third and fourth PT clients. In this case, the response message with respect to the talk burst request message is a talk burst request queue position status message.

The talk burst request queue position status message is transmitted by the PT server 100 to all or some of the PT clients 210-240 in order to inform that the talk burst request is queued or a talk burst request state is changed.

In this example, it is assumed that the second PT 220 for some reason did not receive a response message from the PT server 100 even though it has already transmitted a talk burst request message (original talk burst request message) to the PT server 100. The second PT client 220, which has not received the response message from the PT server 100, determines that the original talk burst request message is lost during its transmission and re-transmits the talk burst request message. The re-transmitted talk burst request message includes the first timestamp, namely, the value of the transmission time of the original talk burst request message.

When the PT server 100 receives the re-transmitted talk burst request message from the second client 220, the PT server 100 transmits the talk burst request queue position status message to the second PT client 220 as a response to the received talk burst request message.

The PT server 100 gives a permission of talk burst to a PT client which has the earliest timestamp among the timestamp values of the talk burst request messages transmitted from the PT clients 220-240. Namely, the PT server 100 places the received talk burst request messages in the talk burst request queue according to the timestamp values of the talk burst request messages. For instance, a talk burst request of a certain PT client having a talk burst request timestamp value that is earlier than that of another PT client is placed in the queue ahead of the talk burst request of that another PT client, so that that another client gets the talk burst after the certain PT client.

Such queue position assignment may be valid within a period until a PT client currently having the talk burst hands over the talk burst to a next PT client. In this process, if the timestamp value of a talk bust request message that the PT server receives is significantly earlier than the current time at the PT server, then the PT server may discard this talk burst request message. For instance, if the PT server receives a re-transmitted talk burst request message that has the talk burst request timestamp value that is significantly earlier than the current time at the PT server, then the PT server ignores and discards this re-transmitted talk burst request message.

Figure 4:
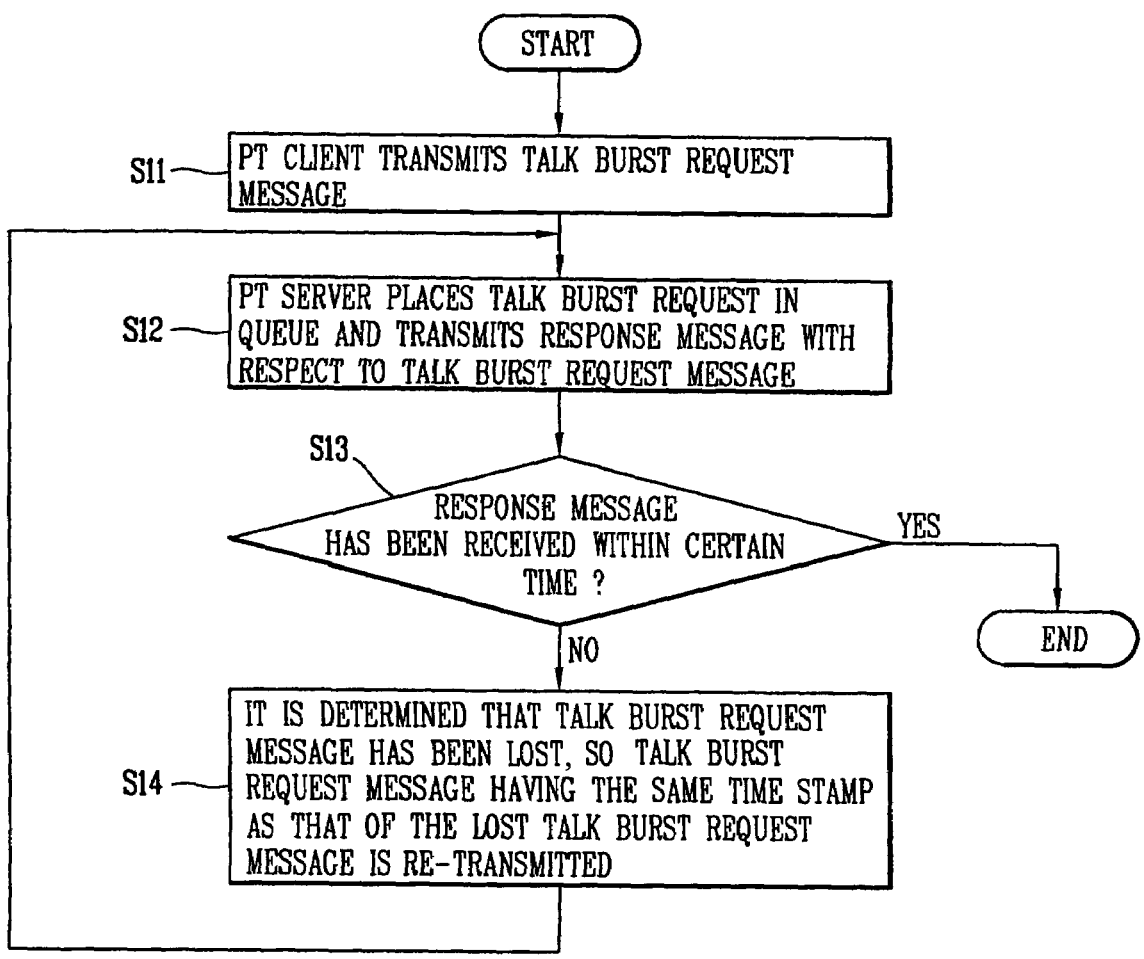
FIG. 4 is a flow chart of a PT service method in accordance with an embodiment of the present invention.

FIG. 4 is a flow chart of a PT service method in accordance with an embodiment of the present invention. This method can implement in the PT service system of FIG. 3, or in other suitable device or system.

Referring to FIG. 4, a PT client transmits a talk burst request message including transmission time information (talk burst request timestamp) to a PT server (step S11). In this case, the PT client transmits the talk burst request message in the form of the TBCP (Talk Burst Control Protocol) format as shown in FIG. 2, and inputs the current transmission time of the talk burst request message in the timestamp field 66. The transmission time can be expressed in such a form as '13:30:22, Dec. 10, 2004', or can be expressed as binary values or bits.

The PT server receives the talk burst request message and places the talk burst request at a certain queue position in the talk burst request queue, according to the transmission time included in the received talk burst request timestamp and to the existing talk burst request timestamps from other clients. The PT server then transmits a response message with respect to the talk burst request message to the PT client (step S12). In this case, the response message is the talk burst request queue position status message. The earlier the value of the talk burst request timestamp is, the higher the queue position of the talk burst request, which means earlier talk burst. Other variations are possible.

Having transmitted the talk burst request message, the PT client checks whether a response message thereto is received within a certain time (step S13). Here, it should be noted that at step S12, the PT server may not receive the original talk burst request message from the PT client because of a transmission error, etc., in which case a talk burst request response from the PTO server would not be generated at all by the PT server.

When a response message is received within a preset time duration ("YES" at step S13), the PT client recognizes that the talk burst request message has been received by the PT server and in a standby state until it receives a specific permission to actually transmit the talk burst.

If, however, a response message from the PT server is not received within the certain time duration ("NO" at step S13), the PT client determines that the original talk burst request message has been lost or delayed during its transmission and re-transmits the talk burst request message (step S115). In this case, a value inputted in the timestamp field of the re-transmitted talk burst request message is not a current transmission time but a transmission time which was included in the initial talk burst request message (i.e., in the original talk burst request message that has been lost).

Upon receiving the re-transmitted talk burst request message, the PT server places the request in the talk burst request queue at a certain queue position based on the transmission time included in the timestamp of the re-transmitted talk burst request message, and transmits a response message with respect to the re-transmitted talk burst request message to the PT client (step S12). In this case, if the value of the talk burst request timestamp of the PT client has an earlier value than the talk burst request timestamp values of other PT clients, it has a higher/earlier talk burst authority among all the talk burst requests of PT clients in a talk burst request queue. If a state of the talk burst request queue is changed, the PT server transmits the talk burst request queue position status message to every PT client which has been set up for a session, so as to inform the PT clients about the change in the order in which the talk burst is given to the PT clients according to the talk burst request queue positions.

Figure 5:
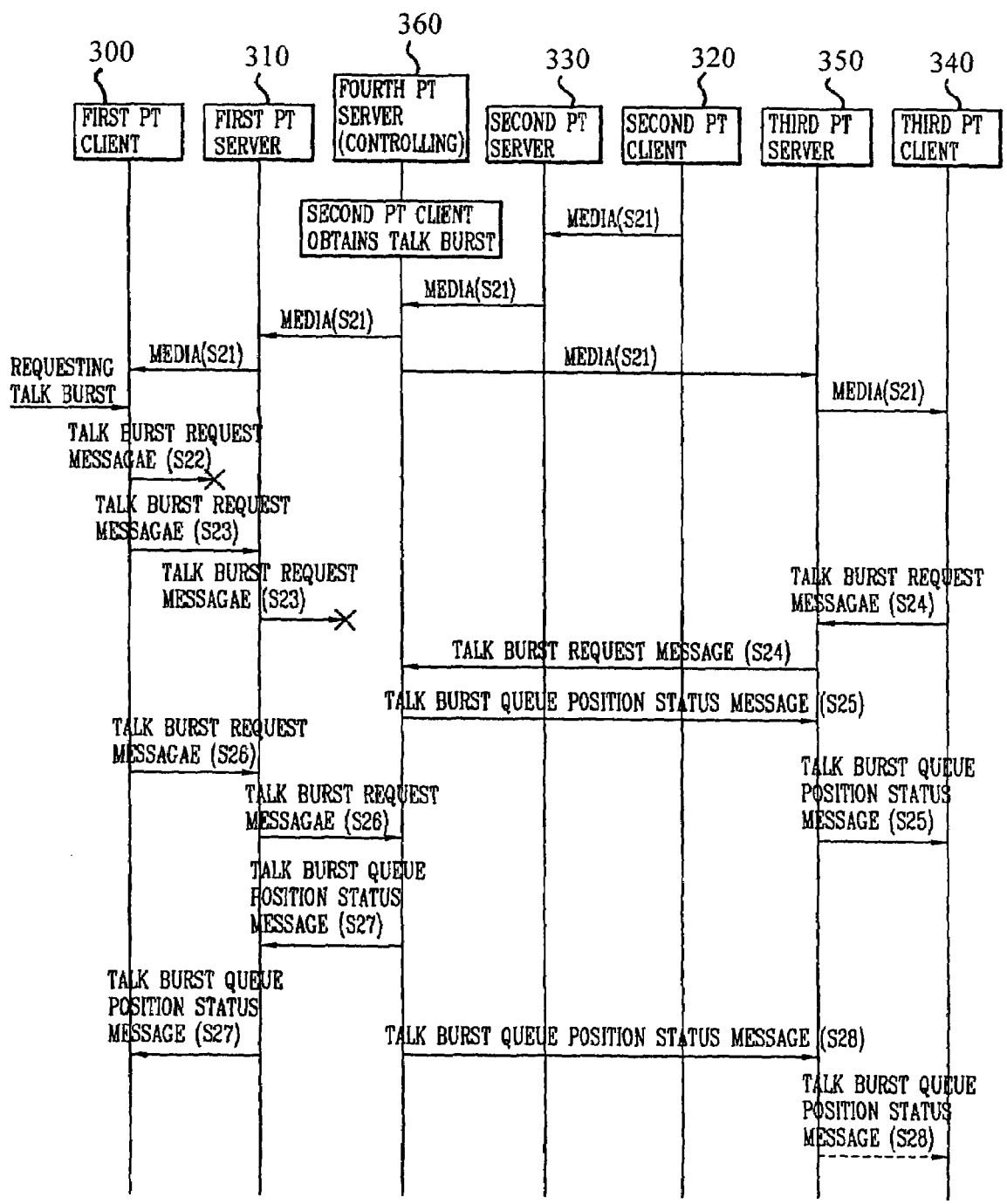
FIG. 5 is a signal flow chart of a PT service method in accordance with an embodiment of the present invention.

FIG. 5 is a signal flow chart of a PT service method in accordance with an embodiment of the present invention. Here, it shows a PT service system including a plurality of PT clients 300, 320, 340, a plurality of PT servers 310, 330, 350 associated respectively to these PT clients, and another PT server 360, all operatively coupled. In this example, one PT server (fourth PT server 360) has a controlling PT function to control PT operations of non-associated PT clients (first through third clients 300, 320, 340) with which a session has been established. Each of the first, second and third clients 300, 320, 340 has the PT server having a participating PT function (first through third PT servers 310, 330, 350).

First it is assumed that the second PT 320 has obtained the talk burst and is currently performing the talk burst, and the fourth PT server 360 controls the PT service system (namely, the fourth PT server has the controlling PT function and supports talk burst control with queuing by means of talk burst request queue).

The fourth PT server 360 transmits a media message transmitted by the second PT client 320 to the session-established first and third PT clients 300 and 340 (step S21). At this time, the media message transmitted by the fourth PT server 360 is transmitted to the first and third PT clients 300 and 340 through the first and third PT servers 310 and 350.

While the second PT client 320 has the talk burst (namely, when the second PT client has permission to send a talk burst), the first PT client 300 transmits a talk burst request message to the fourth PT server 360 in order to obtain a next permission to send a talk burst (step S22). In this case, the first PT client 300 includes a current transmission time in the talk burst request timestamp field of the talk burst request message.

After the talk burst request message is transmitted, if the talk burst request queue position status message is not received within a certain time, the first PT client 300 determines that the original talk burst request message has been lost during the transmission and re-transmits the talk burst request message to the fourth PT server 360 (step S23). In this case, the first PT client 300 inserts the same transmission time as the transmission time which was included in the lost (original) talk burst request message, into the re-transmitted talk burst request message and then, transmits it. Namely, when the PT client repeatedly transmits the talk burst request message until it receives the talk burst request queue position status message from the PT server, the talk burst request message would include the timestamp indicating the transmission time of the original talk burst request message.

In a state that the first PT client 300 has not received the talk burst request queue position status message after having transmitted the talk burst request message, the third PT client 340 can transmit a talk burst request message to the fourth PT server 360 in order to obtain a permission to send a talk burst (step S24). The talk burst request message of the third PT client 340 is transmitted to the fourth PT server 360 through the third PT server 350. In this case, the talk burst request message includes an actual transmission time of that talk burst request message, and such transmission time can be stored in such a form of '13:30:22, Dec. 10, 2004' or can be stored as binary values or bits.

Upon receiving the talk burst request message from the third PT client 340, the fourth PT server 360 places this talk burst request in the talk burst request queue according to its timestamp value and transmits a talk burst request queue position status message to the third PT client 340 (step S25). At this time, the talk burst request queue position status message is a message informing the third PT client 340 of a queue position or status of the corresponding request.

On the other hand, if the talk burst request queue position status message is not received within a certain time, the first PT client 300 re-transmits the talk burst request message to the fourth PT server 360 (step S26). In this case, the re-transmitted talk burst request message includes a value of a timestamp indicating a time when the original talk burst request message was transmitted.

Upon receiving the talk burst request message from the first PT client 300, the fourth PT server 360 places the corresponding request in the talk burst request queue according to the value of the received talk burst request timestamp.

If the value of the talk burst request timestamp of the first PT client 300 is earlier than the value of the talk burst request timestamp of the third PT client 340, the fourth PT server 360 gives a higher priority (earlier queue position) to the first PT client 300 over the third PT client 340, and transmits a talk burst queue position status message to the first PT client 300 (step S27). The fourth PT server 360 can additionally transmit a talk burst request queue position status message having the changed queue position, to the third PT client 340 (step S28).

When the permission to send a talk burst of the second PT client 320 is released, the fourth PT server 360 gives a permission to send a talk burst to a PT client having the earliest talk burst request transmission time. In this case, the fourth PT server 360 transmits a talk burst granted message to the first PT client 300 having the earliest talk burst request timestamp value (at the head of the queue) and transmits a talk burst taken message to the second and third PT clients 320 and 340.

When the permission to send a talk burst is handed over from the second PT client 320 to the next PT client, the fourth PT server 360 initializes the corresponding talk burst request queue. If any timestamp value included in a recently received talk burst request message is a value corresponding to a previous period (e.g., the received timestamp value is significantly earlier than the current time at the fourth PT server 360), the fourth PT server 360 discards that talk burst request message.

As so far described, the PT service system and method in accordance with the present invention have many advantages including the following.

The present invention provides a talk burst request message that includes a timestamp field for providing a timestamp value that is associated with a transmission of the talk burst request message. As such, the talk burst request queuing is performed based on the transmission time of the talk burst request messages, and not based on when the talk burst request messages are actually received by the PT server. As a result, queuing of the talk burst requests can be made to accommodate transmission errors and others, and is also done more accurately.

Further, since the present invention utilizes an existing TBCP format to provide a talk burst request message having a timestamp, implementation of the invention is easy and would be cost-effective.

Also, since a PT client transmits a talk burst request message by using a TBCP (Talk Burst Control Protocol) including information of a transmission time and a PT server sets a talk burst queue position of the PT client based on the transmission time, the PT client which has first transmitted the talk burst request message but did not receive a response thereto, can obtain a permission for a talk burst based on the time when it first transmitted the talk burst request message.

In addition, when the talk burst request message transmitted by the PT client is lost during transmission and thus re-transmitted, information on a transmission time of the original talk burst request message is included in the talk burst request message and the talk burst request message is then transmitted. Accordingly, a talk burst queue position assignment of the original talk burst request message can be determined based on the transmission time and thus the user service quality can be enhanced.

Moreover, since a processing procedure of the PT client and the PT server in case where the talk burst request message transmitted by the PT client is lost is clearly defined, service reliability can be enhanced.

The foregoing embodiments and advantages are merely exemplary and are not to be construed as limiting the present invention. The present teaching can be readily applied to other types of apparatuses. The description of the preferred embodiments of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A PT (push-to) service method of a system including a PT server and a plurality of PT clients, the method comprising:
   receiving, respectively from the plurality of PT clients, a talk burst request message including a timestamp;
   determining talk burst request queue positions of the PT clients at least based on the timestamps; and
   discarding any talk burst request message if a value of the timestamp in that talk burst request message is earlier than a current time at the PT server by more than a certain amount.

2. A method of performing a session based communication, the method performed by a terminal and comprising:
   sending, to a network, a first talk burst request message to request a permission from the network to send a talk burst;
   if a reply to the first talk burst request message is not received from the network within a certain time, sending another talk burst request message that includes a timestamp indicating when the first talk burst request message was sent from the terminal; and
   receiving from the network a response message indicating a queue position of the talk burst request or that the talk burst request was queued.

3. The method of claim 2, further comprising:
   receiving a talk burst granted message from the network if the terminal has the earliest talk burst request timestamp or if the terminal is placed at the head of the queue.

4. The method of claim 2, wherein the reply from the network comprises a talk burst granted message or a talk burst taken message.

5. The method of claim 2, wherein the response message from the network comprises a talk burst queue position status message.

6. The method of claim 2, wherein the session based communication supports at least one push-to service.

7. A method of performing a session based communication, the method performed by a network and comprising:
   receiving, from a terminal, a talk burst request message to request a permission from the network to send a talk burst, the talk burst request message including a timestamp indicating when an original talk burst request message was sent among a plurality of talk burst request messages sent from the terminal, wherein one or more additional talk burst request messages are sent from the terminal if a response message from the network is not received within a certain time duration after the original talk burst request message was sent from the terminal;
   placing the talk burst request message in a queue according to the timestamp included in the talk burst request message; and
   sending to the terminal a response message indicating a queue position of the talk burst request or that the talk burst request was queued.

8. The method of claim 7, wherein the network receives a plurality of talk burst request messages respectively from different terminals, and places requests of the received talk burst request messages in the queue according to the timestamps included in the received plurality of talk burst request messages.

9. The method of claim 7, further comprising:
   giving a permission to the talk burst request having the earliest talk burst request timestamp or to the talk burst request that is placed at the head of the queue.

10. The method of claim 9, wherein in the giving step, the permission is a talk burst granted message.

11. The method of claim 7, wherein the session based communication supports at least one push-to service.

12. A terminal that supports a session based communication, the terminal comprising:
   a push-to client adapted to perform the steps of,
   sending, to a network, a first talk burst request message to request a permission from the network to send a talk burst;
   if a reply to the first talk burst request message is not received from the network within a certain time, sending another talk burst request message that includes a timestamp indicating when the first talk burst request message was sent from the terminal; and
   receiving from the network a response message indicating a queue position of the talk burst request or that the talk burst request was queued.

13. The terminal of claim 12, wherein the push-to client is further adapted to perform the step of receiving a talk burst granted message from the network if the terminal has the earliest talk burst request timestamp or if the terminal is placed at the head of the queue.

14. The terminal of claim 12, wherein the reply from the network comprises a talk burst granted message or a talk burst taken message.

15. The terminal of claim 12, wherein the response message from the network comprises a talk burst queue position status message.

16. The terminal of claim 12, wherein the session based communication supports at least one push-to service.

17. A network that supports a session based communication, the network comprising:
   a push-to server adapted to perform the steps of,
   receiving, from a terminal, a talk burst request message to request a permission from the network to send a talk burst, the talk burst request message including a timestamp indicating when an original talk burst request message was sent among a plurality of talk burst request messages sent from the terminal, wherein one or more additional talk burst request messages are sent from the terminal if a response message from the network is not received by the terminal within a certain time duration after the original talk burst request message was sent from the terminal;

placing the talk burst request message in a queue according to the timestamp included in the talk burst request message; and sending to the terminal a response message indicating a queue position of the talk burst request or that the talk burst request was queued.

18. The network of claim 17, wherein the push-to server is adapted to receive a plurality of talk burst request messages respectively from different terminals, and places requests of the received talk burst request messages in the queue according to the timestamps included in the received plurality of talk burst request messages.

19. The network of claim 17, wherein the push-to server is further adapted to perform the step of giving a permission to the talk burst request having the earliest talk burst request timestamp or to the talk burst request that is placed at the head of the queue.

20. The network of claim 19, wherein in the giving step, the permission is a talk burst granted message.

21. The network of claim 17, wherein the session based communication supports at least one push-to service.

* * * * *